March 26, 1940.  C. HART  2,195,367
MANUFACTURE OF ARTIFICIAL MAGNESITE AND SIMILAR MATTERS
Filed March 30, 1936
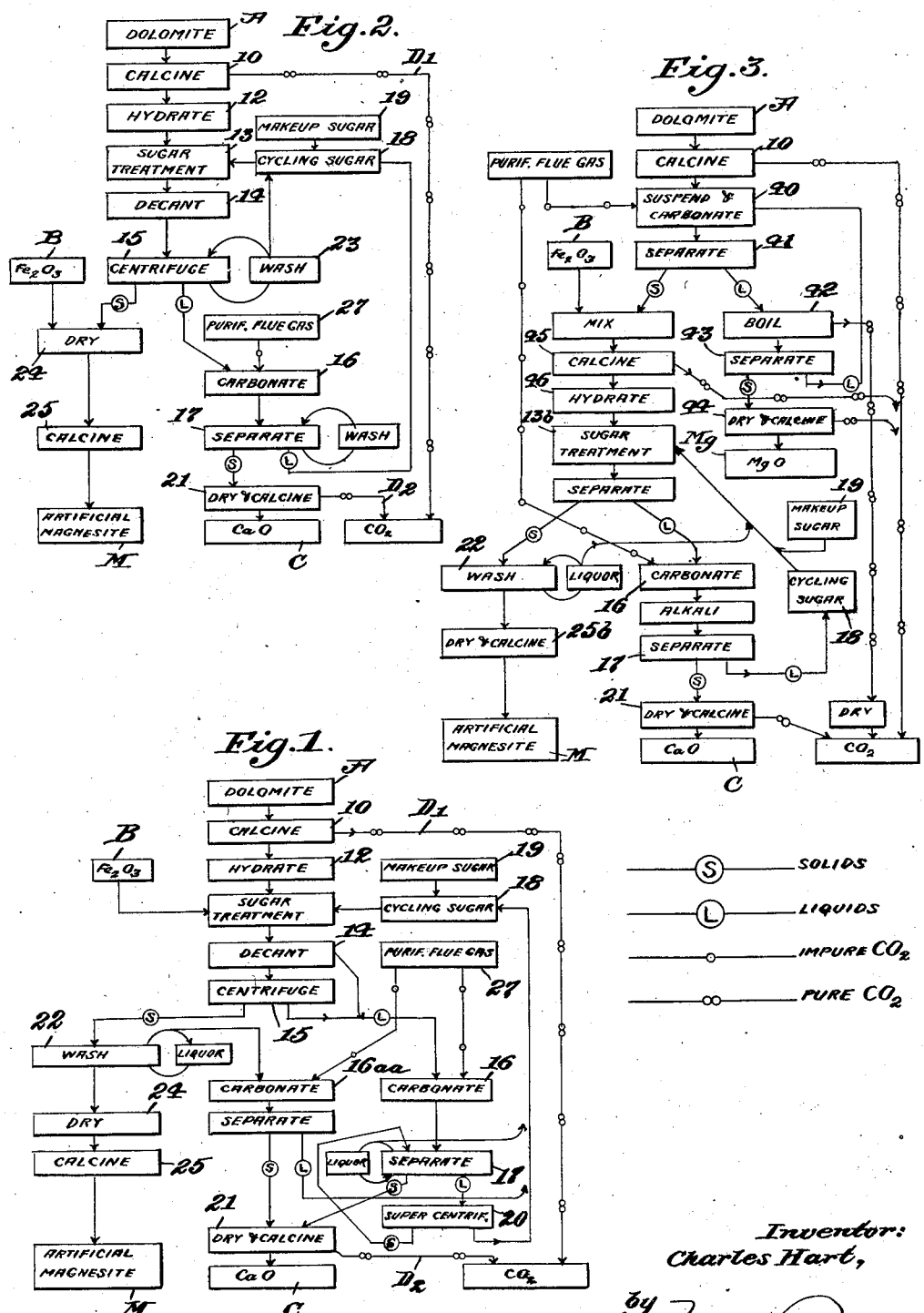
Inventor:
Charles Hart,
by
Attys.

Patented Mar. 26, 1940

2,195,367

UNITED STATES PATENT OFFICE 2,195,367

MANUFACTURE OF ARTIFICIAL MAGNESITE AND SIMILAR MATTERS

Charles Hart, Chester, Pa.

Application March 30, 1936, Serial No. 71,739

4 Claims. (Cl. 106—9)

Magnesite is a material which, among other uses, has an extensive employment as a refractory for metallurgical furnaces. Natural magnesite of the proper quality is relatively expensive, as compared to the ordinary magesium carbonates of natural occurrence; and endeavors have been made to produce a satisfactory substitute for this natural material. The natural material is not a pure magnesium carbonate or its calcined residue, but contains proportions of iron, silicon, and other matters which vary within certain tolerances according to the employment of the material, and usually contains a proportion of lime which must not exceed a certain minimum. Commercial calcined or deadburnt magnesite may contain from 77 to 90 percent or more of magnesium oxide, 3 to 8 percent of calcium oxide, 3 to 12 percent of iron oxide, 2 to 5 percent of silicon oxide, and 1 to 2 percent of aluminum oxide, with an ignition loss ($CO_2$) of less than ½ of 1 percent. The iron content, however, may be increased to as high as 20 percent or even 30 percent for some employments. The quantity of iron introduced depends largely upon the purpose for which the material is to be used. Theoretically it has been assumed that the iron operates to render the calcium, silicon and aluminum oxides less fusible and thus to increase the fusion or sintering point of the magnesite product. There are thus set up various specifications according to the particular constitution of the original magnesite rock which have become recognized in commerce as indicative of materials which are appropriate for certain purposes. With some magnesite rocks, for example, the iron content is too low in proportion to the other impurities; and hence endeavors have been made to exploit such magnesites by enriching them with iron. It is obvious, however, that there is a limiting value with respect to the presence of impurities beyond which the addition of iron does not produce a product capable of general use in the arts.

Many endeavors to synthesize the material have involved the dilution of a purer magnesium compound with these other matters, but here also the cost was great, as sufficiently pure magnesium compounds are likewise difficult to obtain naturally, and the proper incorporation of the added matter creates some difficulties.

Magnesium and calcium usually occur together in nature, in the form of double carbonates or mixed carbonates; and these do not permit simple separation because of the chemical and physical similarities of the bases. Such carbonates, either as occurring in nature or as provided by a preliminary concentration or purification stage, or as industrial products, will hereinafter be referred to as "dolomites," since this name is employed geologically to designate large deposits of this character. Prior proposals for separating one of these bases from the other have usually demanded time-consuming operations, expensive re-agents and apparatus, or extremely close mechanical supervision of the reactions involved, and it was necessary to discard much of the material undergoing treatment, by reason of the lack of clear separations during the course of the procedure.

According to the present invention, it is proposed to prepare an artificial magnesite which responds to trade specifications, and is prepared from such mixed carbonates with a recovery of valuable by-products for bearing a part of the costs of the operations.

In the drawing are shown flow sheets indicating the course of procedure for manufacturing artificial magnesite.

Fig. 1 shows a procedure particularly useful with a magnesium-calcium carbonate containing silica and alumina as impurities.

Fig. 2 shows a modified procedure which is particularly useful with a magnesium-calcium carbonate containing a relatively low proportion of such impurities.

Fig. 3 shows a further modification of the procedure.

The following is set out as an example of practicing the invention according to Fig. 1, with related quantities of materials employed. The dolomite employed for this example had an analysis comprising magnesium oxide 21.36; calcium oxide 30.25; silicon dioxide 0.55; iron and aluminum oxides, etc., 0.45; ignition loss (carbon dioxide) 47.33; this analysis representing a total of 99.94 percent.

This dolomite A in Fig. 1 was subjected to a calcining operation 10 and caused to give off the carbon dioxide D1, so that the magnesium-calcium carbonates are brought to simple oxide form, and the carbon dioxide gas D1 is drawn off for storage or employment in making solidified carbon dioxide as a refrigerant. The calcined product contained, for each 5 parts of dolomite by weight, 1.512 parts of calcium oxide and 1.060 parts of magnesium oxide. The calcined product was comminuted by hydrating and grinding if necessary. It is preferred to effect this hydration 12 in order to avoid excessively heating the sugar solution and to permit a rapid operation. Ten grams of this hydrated product was then mixed with a quantity B of iron, in oxide form, since the iron content of the original dolomite is less than demanded by the specification to be filled. In the illustrative example, 10 grams of the hydrated dolomite was blended with iron oxide B containing 0.4321 gram of iron. This mixture was then subjected to a sugar treatment 13 by introducing it to a sugar solution. This sugar solution contains a concentration of sucrose or saccharose which may range from a 10 to a 40 percent solution of sugar in water. In the particular illustration, 27.7 grams of sugar was introduced in the form of a 30 percent aqueous solution. Digestion was accomplished at a temperature between 80 to 100 degrees by agitating and permitting the matter to stand over night. The undissolved solids formed a sediment at the bottom of the digesting vessel and by a decanting operation 14, the supernatant liquid was withdrawn. The sediment, with further liquid mixed therewith, was then introduced into a bowl centrifugal apparatus and a separation 15 accomplished. The liquid is preferably subjected further to a so-called "supercentrifugal separation" to eliminate floating particles which are then mixed with the bowl cake. The bowl cake mixture may then be washed (22) to eliminate calcium sucrate, if it is necessary to obtain a final magnesia which is substantially free from lime. The liquor from this separation was then mixed with the decanted liquor and brought into a carbonating vessel and subjected (16) to the flow of carbon dioxide gas, employing phenolphthalein as an indicator for test specimens, and observing precaution to avoid rendering the liquor acid. The maintenance of alkalinity in this liquor is preferred, in order to avoid any inversion of the sugar. It is preferred to follow the course of the carbonation by testing from time to time: if the liquor passes the neutral point, carbonation is immediately interrupted and quick lime or calcium hydroxide is immediately introduced to render the liquor alkaline.

This carbonation 16 results in the precipitation of lime as carbonate from the calcium sucrate which formed the soluble matter in the decanted and separated liquid. The proportion of sugar to lime is preferably maintained at a ratio of around 6:1 to assure a separation between the calcium and the magnesium in the sugar treatment phase. After carbonation, the mixture is permitted to settle and separated (17) by decanting followed by filtering or preferably a centrifugal separation. An alkaline sugar solution 18 is thus withdrawn for recycling back to the sugar treatment phase 13, with a make-up of sugar 19 if necessary to maintain concentration. In particular, the solid residue from the separation 17 is washed with water which is caused to cycle over successive portions whereby it takes up the sugar which has remained in the residue, so that this wash liquor is constantly increasing in sugar concentration. Portions of it are then withdrawn from time to time for utilization (with make-up sugar 19) for maintaining the volume of sugar solution for the treatment 13. The decanted and separated liquor providing the sugar solution 18 may be subjected to a supercentrifugal separation 20 for eliminating any suspended solids which are then returned for mixture with the solids in the separation phase 17 so that they are duly washed. Similarly, the wash liquors are preferably separated by the supercentrifugal action before being mixed with the cycling sugar solution 18. The losses of sugar are thus very small, as will be set out hereinafter. The filter or centrifugal cake is then subjected to drying and to a calcining operation 21, with the result that a further quantity D2 of carbon dioxide is obtained and passed to the storage, while a calcium oxide C is obtained in quantity of 3.2080 grams, and having an analysis of calcium oxide 97.24; magnesium oxide 0.66; silicon dioxide 0.00; aluminum oxide 0.29; ferric oxide 1.09; with an ignition loss of 1.28, or a total analysis of 100.56 percent.

The centrifugal cake from the separation 15 is subjected to two washings 22 with a weak sugar liquor (for example, 2 to 10 percent), the wash liquor being recycled as designated at 23, so that the sugar content is successively increased; and this liquor therefore represents a recovery of sugar and is available for mixing with the cycling sugar solution 18 as stated above, after a carbonation treatment 16aa, followed by filtering of centrifugal separation.

The washed solids of the centrifugal cake from the separation 15 are then subjected to a drying operation 24 and to a calcining operation 25 at a temperature of the order of 1000 degrees C., with the production of an artificial magnesite M in quantity of 4.2569 grams, and having an analysis of magnesium oxide 79.86; calcium oxide 7.24; silicon dioxide 0.18; aluminum oxide 0.35; iron oxide 13.79; and is of a light iron color. By continuing the calcining 26 at 1000 degrees C. for 12 hours, this material takes on the characteristic dark red color of dead burnt magnesite, indicating the ferrite of magnesia.

By introducing a different quantity B of iron into the mixture, it is obvious that a different analysis can be satisfied during the course of the operation; and by further washing following the centrifugal separation 15, a lesser proportion of calcium oxide will be retained in the final magnesite.

It is not necessary to employ the carbon dioxide going to storage for the carbonation step 16, as a purified flue gas 27 containing carbon dioxide and nitrogen may be employed at this point, so that the carbon dioxide from the calcining step 21 represents a further gain of valuable carbon dioxide to be employed as a by-product, as set out in my copending application Serial No. 71,738, filed March 30, 1936.

The feasibility of recycling the sugar solution through the several steps is demonstrated by the results obtained. For example, it was found that a 30 percent sugar solution had substantially the same extraction value at the fourth operation that it had at the first operation, and that during experimentation, the acceptance by the sugar solution of lime from hydrated burnt dolomite often showed an apparent increase, possibly owing to conditions arising in determining the end point of the carbonation step 16, and in the washing accomplished at the separation steps 17 and 20.

In experimentation to determine the proper concentration of sugar solution, it was found that concentrations lower than 10 percent are not economical owing to the expense of handling such large quantities of liquid; while concentrations above about 40 percent are too viscous for permitting a proper decantation, filtration or other separation from the undissolved residue. In comparing different strengths of solution in columns of liquid 10 inches in height, it was found that a 10 percent sugar solution carying a ratio of 5.63 grams of lime settled to 0.75 inch in 6 hours, with no further separation after 24 hours. A 20 percent solution carrying a ratio of 11.25 grams of lime settled to 1.37 inches in 6 hours and 1.00 inch after 24 hours. A 30 percent solution carrying 16.90 grams of lime settled to 2.25 inches in 6 hours and to 1.62 inches after 24 hours. A 40 percent sugar solution carrying 22.40 grams of lime settled to 6.5 inches in 6 hours, and to 2.62 inches after 24 hours. A 50 percent sugar solution carrying 28.00 grams did not permit apparent sedimentation in 6 hours. The sedimentation and decantation offer a particularly cheap manner of carrying out the process; and hence it is preferred to employ solutions of sugar containing 20 to 30 percent, owing to the fairly rapid sedimentation effected.

Following sedimentation, as stated above, a centrifugal separation is accomplished. The rate of passage of the solution through the centrifugal separator, as well as the sugar content, determined the effectiveness of the separation. For example, using a 12 percent sugar solution, with the centrifuge operating at 100 gallons per hour, 0.017 gram of solids per hundred cc. were present in the separated liquid; at 200 gallons per hour, the solids were 0.0194 gram; and at 300 gallons per hour, 0.055 gram. With a 25 percent sugar solution and a separation of 100 gallons per hour, the solids were 0.0115 gram; at 200 gallons per hour, they were 0.0365 gram; and at 500 gallons per hour, they were 0.190 gram. Using a 50 percent sugar solution and 75 gallons per hour, the solids contained in the effluent liquid were 0.4397 gram.

When the decantation was employed, or a preliminary centrifugal separation, the grams of solid residue in the effluent liquid per hundred cc. were much less. Thus, when the above centrifugal separator was operated at 600 gallons per hour with a 12 percent sugar solution, the solids were 0.0880 gram per hundred cc. On passing this for a further separation by centrifugal action, as stated above, at a rate of 150 gallons per hour, there were 0.0010 gram; at 200 gallons per hour, there were 0.0035 gram; and at 500 gallons per hour, there were 0.0040 gram.

Prior to the washing operation 22 following the centrifugal separation 15, it was found that the centrifugal cake contained 1.8 percent of the original sugar as sucrate of lime, and this was successively reduced by using the wash liquors. This wash liquor can be recycled until it is so high in sucrate that it is inefficient for washing, but is thereby rendered available and effective for making up in the cycling sugar solution 18.

This example therefore shows that a separation can be effected between the magnesium and calcium values, with a direct recovery of the magnesium values as magnesite, and with the recovery of a highly pure calcium oxide and carbon dioxide as by-products to reduce the cost of manufacture.

In a further example of practicing the invention, as set out in Fig. 2, the raw material A comprised 19.1334 grams of Michigan dolomite (containing 5.8060 grams of calcium oxide and 4.0996 grams of magnesium oxide) was burnt and re-calcined to a constant weight of 10.0776 grams, and had an original analysis of magnesium oxide 21.36; calcium oxide 30.25; silicon dioxide 0.55; mixed iron and aluminum oxide 0.45; and an ignition loss of 47.33. This was subjected to the calcining operation 10, followed by the hydration 12 and the sugar treatment 13. The sucrate liquors were withdrawn, carbonated (16) and the sugar solution recycled as before, the solids being washed and separated for obtaining a recovery of 99.46 percent of the total lime in a material having an approximate analysis of calcium oxide 98.64; magnesium oxide 0.83; silicon dioxide 012; iron and aluminum oxides 0.64; ignition loss 0.47.

The solid residue from the sugar treatment was washed, mixed with iron oxide (B) and calcined at 1400 degrees C. until a dead burnt magnesite resulted. The quantity of solids from the sugar treatment amounted to 4.4106 grams for 10.0776 grams of calcined dolomite, with an analysis of magnesium oxide 98.04; calcium oxide 1.20; silicon dioxide 0.80, mixed iron and aluminum oxides 0.76; and ignition loss 0.65 after calcination. By mixing with 0.8441 gram of such material, a quantity B of 0.0683 gram of ferric oxide and calcining as stated above, the ultimate magnesite M had an analysis of magnesium oxide 90.60; calcium oxide 1.04; silicon dioxide 0.60; mixed iron and aluminum oxides 8.48, of which latter of course the larger proportion was the added iron oxide. This is an artificial magnesite of very high analysis.

In the form of practice shown in Fig. 3, the separation is effected by withdrawing magnesium from the mixture, then withdrawing calcium, and finally utilizing the undissolved residue in making the magnesite.

In this case, the dolomite A was a Pennsylvania variety. It was subjected as before to a calcining operation 10 with the elimination of a quantity D1 of carbon dioxide. The burnt dolomite was hydrated in an operation 12 as before, and an excess of water added. The analysis of this particular hydrated dolomite comprised magnesium oxide 33.96; calcium oxide 46.08; silicon dioxide 2.00; iron and aluminum oxides 1.08; and an ignition loss of 16.95, to a total of 100.89 percent.

Twenty grams of this hydrate were placed in an iron tank and subjected to a carbonation operation 40 in the presence of 500 cc. of water. Carbon dioxide was introduced at a pressure of 15 to 20 pounds, with a temperature between 10 and 16 degrees C., and at the rate of 11.05 cubic feet per hour for 3 hours. When purified flue gas is employed, the gauge pressure of the mixture is increased until the partial pressure of carbon dioxide amounts to ½ to 2 atmospheres or more. As a result, a primary separation between magnesium and calcium was effected, by which substantially all of the calcium oxide was precipitated as calcium carbonate, and the magnesium oxide was converted to carbonate, and then in major portion to magnesium acid carbonate; by chemical control of the solution, it is feasible to determine a course of carbonation so that substantially all of the calcium carbonate remains precipitated while most of the magnesium is in dissolved form as acid carbonate; although, of course, this separation is not perfect under commercial conditions of operation. It is preferred to interrupt the operation prior to the re-dissolution of any substantial quantity of calcium, however, as magnesium oxide is a more valuable commercial article when pure than pure calcium oxide. The carbonated mixture is permitted to settle and is separated (41) by decantation and filtering or preferably centrifugal action. The liquids are joined, including wash liquors if washing be performed, and contain magnesium acid carbonate representing a yield of around 76 percent of the total magnesium in the dolomite with a purity of around 99 percent. This solution can then be boiled (at 42) to drive off a portion of the carbon dioxide gas which can be captured, dried and employed as pure carbon dioxide as above, with the precipitation of magnesium carbonate which can be separated by sedimentation, decantation, and filtration or centrifuge action 43. The resulting product comprises 5.1974 grams of magnesium oxide, with an analysis of magnesium oxide 99.2; calcium oxide 0.26; and silicon dioxide and iron oxide 0.54. It can be dried and calcined (44) to yield a further proportion of pure carbon dioxide gas and to yield a pure magnesia alba Mg.

The solids from the carbonation step 40, as separated at the step 41, comprise a material yielding 10.1818 grams after calcining. They contain substantially all of the calcium in the form of calcium carbonate, along with magnesium carbonates, silica, alumina, iron oxide, and other insoluble impurities. They can be mixed with further iron oxide B, as indicated in the first example, to make up a proper analysis according to the specification, and then calcined (45) to drive off the carbon dioxide (which also is captured as a by-product), and then is hydrated (46) and subjected to a sugar treatment 13b as in the first example, with a corresponding separation of lime C from the magnesium and from insoluble matters. For the above quantities, 93 grams of a 30 percent sugar solution can be employed as the cycling agent for the above quantities.

This procedure can be adjusted according to the physical and chemical constitution of the original dolomite, by regulating the carbonation step 40 and the sugar treatment step 13b to give a desired ratio of magnesium to calcium, as described above, while the iron may be controlled by the proportion introduced.

The final lime product C in this instance was found on analysis to comprise 8.1137 grams containing calcium oxide 99.2; magnesium oxide 0.00; and silicon dioxide and iron oxides 0.80; and representing 88 percent of the original calcium in the dolomite.

The insoluble residue from the sugar treatment 13b was passed as before through the step, and was found to contain substantially all of the original insolubles (silica, alumina) as well as substantially all of the added iron B. This can be utilized directly if the original constitution of the dolomite is low in such ingredients, and a careful parting has been effected in the sugar treatment 13b for the direct manufacture of artificial magnesite by drying and calcining. If the ratio of magnesium is low in comparison to the specification to be filled, magnesium carbonate may be introduced from the step 43 above, or calcined magnesia alba (MgO) may be introduced thoroughly mixed at this stage. The mixture is then dried and calcined (25b) as before to produce artificial magnesite M.

In a similar procedure, using a Pennsylvania dolomite, with an analysis of magnesium oxide 33.96; calcium oxide 46.96; silicon dioxide 2.00; iron oxide 1.08; ignition loss 16.95 in the hydrated form, in quantity of 20 grams of this hydrate, a final product of magnesia was produced which contained 99.2 percent of magnesium oxide; 0.26 percent of calcium oxide; 0.54 percent of silicon, aluminum and iron oxides, in quantity of 5.1974 grams and representing 76 percent of the total magnesia. The result of the sugar treatment was the production of calcium oxide in quantity of 8.1137 grams having an analysis of 99.2 percent of calcium oxide; 0.00 of magnesium oxide; and 0.80 percent of mixed silicon and iron oxides. The residual product from the separation following the removal of the sucrate liquor contained the remainder of the magnesium and calcium oxides, and was then built up by the addition of further magnesium oxide from the separation operation 43, and with the addition of finely divided iron oxide to the required specification, and was then subjected to an intensive calcining at 1000 degrees C. for several hours until the characteristic color of dead burnt magnesite resulted.

The operation is set out in simple form, but it will be understood that the washing operations, recoveries of sugar, and recoveries of carbon dioxide may be accomplished as pointed out for the other examples.

This recovery of carbon dioxide is described and claimed in my copending application Serial No. 71,738, filed March 30, 1936; while the separation of a substantially pure magnesium product (as distinguished from artificial magnesite) is described and claimed in my copending application Serial No. 71,740, filed March 30, 1936, to which applications reference may be made for the general procedures employed in this work.

As stated, the sucrose or saccharose may be introduced as crystalline sugar, but it is usually preferable to employ sugar waste such as molasses from beet or cane sugar factories, as this material contains as high as 30 percent or more of available saccharose, and represents a cheap source of this product. The course of the treatment leads to a loss of less than 1 percent of the sugar in each operation per se, and with the employment of washing of precipitates or sediments from sugar treatment, this loss is reduced to a small fraction of a percent. In particular, the sugar solution is maintained alkaline throughout its cycle insofar as possible. The carbonation steps in the presence of sugar are regulated by proper testing of specimens with the use of a suitable indicator, such as phenolphthalein, and permits the interruption of the carbonation before the solution becomes acid. The alkaline nature of the solution operates to prevent inversion of the sugar and losses from this cause. Interruption of the carbonation does not represent a loss of lime, as this lime is carried back with the cycling sugar solution and is ultimately regained. As stated, if the solution is made acid, it is immediately rendered alkaline again by the addition of lime.

The procedure is characterized in the employment of an original material which is too high in lime or other material for commercial acceptance, as a source of burnt magnesite. This lime is eliminated, and a valuable co-product gained. Normally, such materials are too low in iron to correspond to trade specifications; and hence iron oxide or a substance producing iron oxide during the course of the action is introduced, preferably at an early stage of the procedure. This iron is held in undissolved form during the course of the carbonation, and substantially all of it passes forward and becomes a part of the artificial magnesite. By introducing it at an early stage, but prior to calcination for example, a more intimate union of the material is effected, as all components are present in the form of very fine powders, and hence are ready for reaction as necessary during the course of the calcination, in order to produce the artificial magnesite product.

It is obvious that the invention is not limited solely to the forms of practice set out in the above examples, but that it may be employed in many ways within the scope of the appended claims.

I claim:

1. The method of preparing an artificial magnesite refractory, which comprises calcining a dolomite or like magnesium-calcium compound containing an iron compound as a native impurity, treating the calcinate with a strong cycling sucrose solution having a sucrose concentration of 20 to 30 percent and centrifugally separating the sucrate liquor, washing the undissolved residue with a weak sucrose solution in a cyclic manner to effect a strengthening of said weak sucrose solution by abstracting calcium sucrate from the undissolved residue, the proportions of sucrose solutions employed being effective to reduce the calcium content of the insoluble matter to less than eight percent as calcium oxide, from time to time adding the cycling strengthened weak sucrose solution and sucrose to the cycling strong sucrose solution to maintain the volume and concentration thereof, carbonating the cycling sucrose solution to convert calcium sucrate to calcium carbonate and sucrose and terminating such carbonation while the solution is still alkaline and separating the calcium carbonate from sucrose solution, and returning the sucrose solution in cycle as aforesaid, carbonating the aforesaid undissolved residue in the presence of water and thereby effecting a solution of a part of the magnesium as acid magnesium carbonate and removing the dissolved magnesium compound whereby to increase the relative proportion of iron with respect to the magnesium present, and re-calcining the insoluble matter including the remaining magnesium and iron compounds to produce the artificial magnesite refractory.

2. The method of preparing an artificial magnesite refractory, which comprises calcining a dolomite or like magnesium-calcium compound containing an iron compound as a native impurity, treating the calcinate with a strong cycling sucrose solution having a sucrose concentration of 20 to 30 percent and centrifugally separating the sucrate liquor, washing the undissolved residue with a weak sucrose solution in a cyclic manner to effect a strengthening of said weak sucrose solution by abstracting calcium sucrate which has remained with the undissolved residue, the proportion of sucrose solution employed being effective to reduce the calcium content of the insoluble matter to less than eight percent as calcium oxide, from time to time adding the cycling strengthened weak sucrose solution and sucrose to the cycling strong sucrose solution to maintain the volume and concentration thereof, carbonating the calcium sucrate liquor to precipitate most but not all of the calcium as calcium carbonate while maintaining the solution alkaline, returning the alkaline sucrose solution in cycle for treatment of further calcined dolomite, and recalcining the insoluble matter including the remaining magnesium and iron compounds to produce the artificial magnesite refractory.

3. The method of preparing an artificial magnesite refractory of predetermined analysis and including magnesium and iron and restricted quantities of impurities including calcium, silicon and aluminum, from a natural dolomite containing calcium, magnesium, iron, silicon and aluminum in combined form, which comprises calcining the dolomite to form a calcinate including calcium and magnesium oxides, suspending the calcinate in water and carbonating for effecting a solution of a major portion but not all of the magnesium oxide as magnesium acid carbonate and without effecting a solution of calcium and iron carbonates formed, separating the magnesium acid carbonate from insoluble matters, recalcining the insoluble matters and treating with a cycling sucrose liquor in a concentration of 20 to 30% of sucrose and thereby effecting a substantially complete elimination of calcium as dissolved calcium sucrate, separating the calcium sucrate from the insoluble residue of said treatment, carbonating the calcium sucrate liquor for precipitating calcium carbonate and returning the sucrose liquor in cycle, the carbonation being terminated while the sucrose liquor is still alkaline so that the sucrose liquor remains alkaline substantially throughout its cycle, mixing a part of the magnesium separated as magnesium acid carbonate with the insoluble residue to establish the said predetermined proportion of magnesium to iron and other ingredients, and heating the mixture to produce the artificial magnesite refractory.

4. A method as in claim 3, including the step of adding iron oxide in finely divided form to the insoluble matters prior to the re-calcining operation whereby to establish the predetermined ratio of iron to calcium, silicon, and aluminum and to cause an intimate distribution of the added iron by the effects of the repeated calcining and other said treatments thereof.

CHARLES HART.